(12) United States Patent
Kuriyama et al.

(10) Patent No.: US 7,235,323 B2
(45) Date of Patent: Jun. 26, 2007

(54) FUEL CELL ASSEMBLY AND METHOD FOR MAKING THE SAME

(75) Inventors: Nariaki Kuriyama, Saitama (JP); Jun Sasahara, Saitama (JP); Tadahiro Kubota, Saitama (JP); Toshifumi Suzuki, Tokyo (JP); Yuji Isogal, Saitama (JP); Sang-Joon John Lee, Stanford, CA (US)

(73) Assignees: Honda Giken Kogyo Kabushiki Kaisha, Tokyo; The Board of Trustees of the Leland Stanford Junior University, Palo Alto, CA (US)

( * ) Notice: Subject to any disclaimer, the term of this patent is extended or adjusted under 35 U.S.C. 154(b) by 310 days.

(21) Appl. No.: 10/275,642

(22) PCT Filed: May 8, 2001

(86) PCT No.: PCT/US01/11764

§ 371 (c)(1),
(2), (4) Date: Mar. 31, 2003

(87) PCT Pub. No.: WO01/95407

PCT Pub. Date: Dec. 13, 2001

(65) Prior Publication Data

US 2004/0091758 A1    May 13, 2004

Related U.S. Application Data (60) Provisional application No. 60/242,136, filed on Oct. 23, 2000, provisional application No. 60/202,827, filed on May 8, 2000.

(51) Int. Cl.
*H01M 2/20* (2006.01)
(52) U.S. Cl. .......................................... 429/38; 429/22

(58) Field of Classification Search .................. 429/20, 429/22–25, 30, 38, 39
See application file for complete search history.

(56) References Cited

U.S. PATENT DOCUMENTS 6,214,487 B1 * 4/2001 Kelley et al. .................. 429/23
6,527,943 B1 * 3/2003 Zhang et al. ............... 205/787

(Continued)

FOREIGN PATENT DOCUMENTS

CA    2336354    1/1999

(Continued)

*Primary Examiner*—Tracy Dove
(74) *Attorney, Agent, or Firm*—Lumen Intellectual Property Services, Inc.

(57) ABSTRACT

In a fuel cell assembly with at least one cell including an electrolyte layer, a pair of gas diffusion electrode layers interposing said electrolyte layer between them, and a pair of flow distribution plates (5) for defining passages (10, 11) for fuel and oxidizer gases that contact said gas diffusion electrode layers, a heater 62 and various sensors (61*a*, 61*b* and 61*c*) are formed on at least one of the flow distribution plates so that the work needed for installing the heater and sensors is simplified. By embedding them in a substrate, the need for a complex sealing arrangement can be eliminated. In particular, if each flow distribution plate is formed by performing an etching process on a substrate, and forming the heater and sensors in succession to the step of forming each flow distribution plate, the installation of sensors and fabrication of the fuel call are simplified.

5 Claims, 6 Drawing Sheets

U.S. PATENT DOCUMENTS 6,638,654 B2 * 10/2003 Jankowksi et al. ............ 429/26
6,649,293 B1 * 11/2003 Jones .......................... 429/26
6,677,066 B1 *  1/2004 Jansen et al. ................. 429/7

FOREIGN PATENT DOCUMENTS

| | | |
|---|---|---|
| CA | 2352067 | 11/1999 |
| JP | 8-185878 | 7/1996 |
| JP | 11-162490 | 5/1999 |
| WO | WO 99/67869 * | 9/1999 |

* cited by examiner

FUEL CELL ASSEMBLY AND METHOD FOR MAKING THE SAME

This application claims the benefit of U.S. Provisional Application Nos. 60/202,827, filed May 8, 2000, and 60/242,136, filed Oct. 23, 2000, both of which are herein incorporated by reference.

TECHNICAL FIELD

The present invention relates to a fuel cell assembly typically including a plurality of fuel cells each including an electrolyte layer, a pair of diffusion electrode layers placed on either side of the electrolyte layer, and a pair of flow distribution plates placed on either outer side of the diffusion electrode layers to define passages for distributing fuel and oxidant in cooperation with the opposing surfaces of the diffusion electrode layers.

BACKGROUND OF THE INVENTION

A fuel cell includes an electrolyte layer and a pair of electrodes placed on either side of the electrolyte layer, and generates electricity through an electrochemical reaction between fuel gas such as hydrogen and alcohol and oxidizing gas such as oxygen and air, which are supplied to the corresponding electrodes, with the aid of a catalyst. Depending on the electrolytic material used for the electrolyte layer, the fuel cell may be referred to the phosphoric acid type, solid polymer type or molten carbonate type.

In particular, the solid polymer electrolyte type fuel cell (SPFC) using an ion-exchange resin membrane for the electrolyte layer is considered to be highly promising because of the possibility of compact design, low operating temperature (100° C. or lower) and high efficiency, as opposed to the solid oxide type fuel cell (SOFC).

The SPE typically includes an ion-exchange resin membrane made of perfluorocarbonsulfonic acid (Nafion: tradename), phenolsulfonic acid, polyethylenesulfonic acid, polytrifluorosulfonic acid, and so on. A porous carbon sheet impregnated with a catalyst such as platinum powder is placed on each side of the ion-exchange resin membrane to serve as a gas diffusion electrode layer. This assembly is known as a membrane-electrode assembly (MEA). A fuel cell can be formed by defining a fuel gas passage on one side of the MEA and an oxidizing gas passage on the other side of the MEA by using flow distribution plates (separators).

Typically, such fuel cells are stacked, and the flow distribution plates are shared by the adjacent fuel cells in the same stack.

When operating a fuel cell in a stable manner, it is essential to control the flow rates of the gases according to the temperatures of the gases and electrolyte, and the gas flow rates. For instance, Japanese patent laid open to publication No. 8-185878 and Japanese patent laid open to publication No. 11-162490 teach the provision of sensors in a fuel cell for detecting the temperatures and flow rates of the reaction gases.

However, according to such previous proposals, because the sensors are provided outside the fuel cell, it is not possible to obtain the desired information from each individual cell, and this prevents an accurate detection and control. Japanese patent laid open to publication No. 11-162490 discloses voltage sensors and resistive sensors which are installed in a fuel cell stack. However, installing the sensors m such a way creates the need for a highly complex sealing arrangement. This not only complicates the assembly work for the fuel cell stack, but also causes some difficulty in ensuring the durability of such a sealing arrangement. This problem is particularly serious when a sensor is desired to be installed in each fuel cell of a fuel cell stack.

BRIEF SUMMARY OF THE INVENTION

In view of such problems in the prior art, a primary object of the present invention is to provide a fuel cell assembly which allows a sensor and/or heater to be formed in a fuel cell without complicating the sealing arrangement.

A second object of the present invention is to provide a fuel cell assembly which allows a sensor and/or heater to be formed in a fuel cell without complicating the fabrication process.

According to the present invention, such objects can be accomplished by providing a fuel cell assembly with at least one cell including an electrolyte layer, a pair of gas diffusion electrode layers interposing the electrolyte layer between them, and a pair of flow distribution plates for defining passages for fuel and oxidizer gases that contact the gas diffusion electrode layers, so that: a heater and/or a sensor for detecting temperature, gas flow rate or gas pressure is integrally formed with at least one of the flow distribution plates. Preferably, by forming the heater and/or sensor by depositing a film of material therefor on at least one of the flow distribution plates, forming each flow distribution plate by performing an etching process on a substrate, and conducting these steps in succession, the work needed for installing the heater and/or sensor is simplified. By embedding them in a substrate, the need for a complex sealing arrangement can be eliminated.

BRIEF DESCRIPTION OF THE DRAWINGS

Now the present invention is described in the following with reference to the appended drawings, in which:

FIGS. 6(a) to 6(i) are sectional views illustrating the fabrication process of the sensor and heater of the fuel cell of the present invention.

DETAILED DESCRIPTION OF THE PREFERRED EMBODIMENTS

Figure 1:
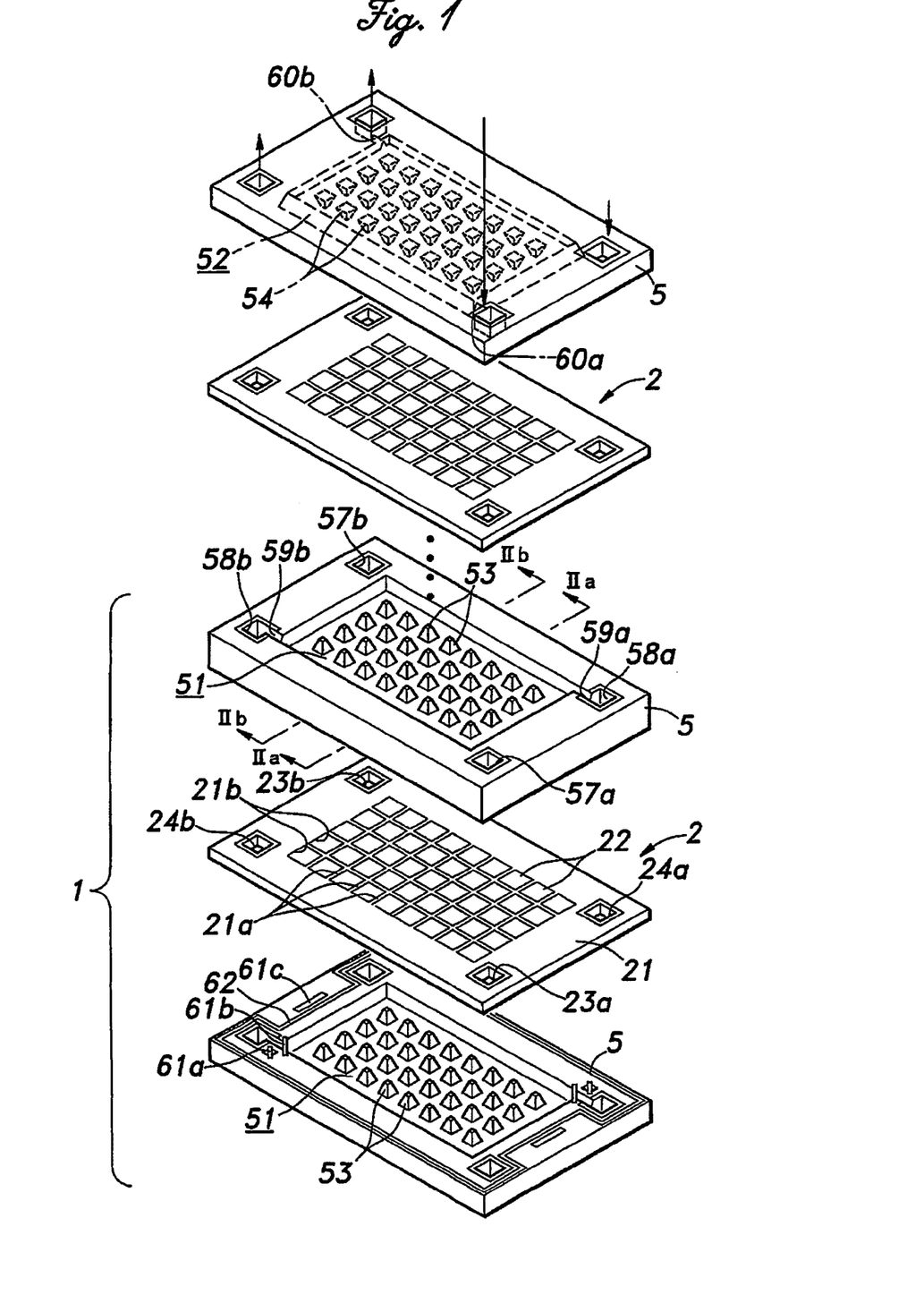
FIG. 1 is an exploded perspective view of a part of a fuel cell assembly embodying the present invention.

FIG. 1 is an exploded perspective view showing the structure of a part of a fuel cell assembly embodying the present invention. In practice, a plurality of cells are formed into a stack, and a number of such stacks are connected in series and/or parallel, and fuel consisting of reformed alcohol, hydrogen gas or the like is supplied to each fuel cell stack along with oxidizing gas such as air.

Figure 2A:
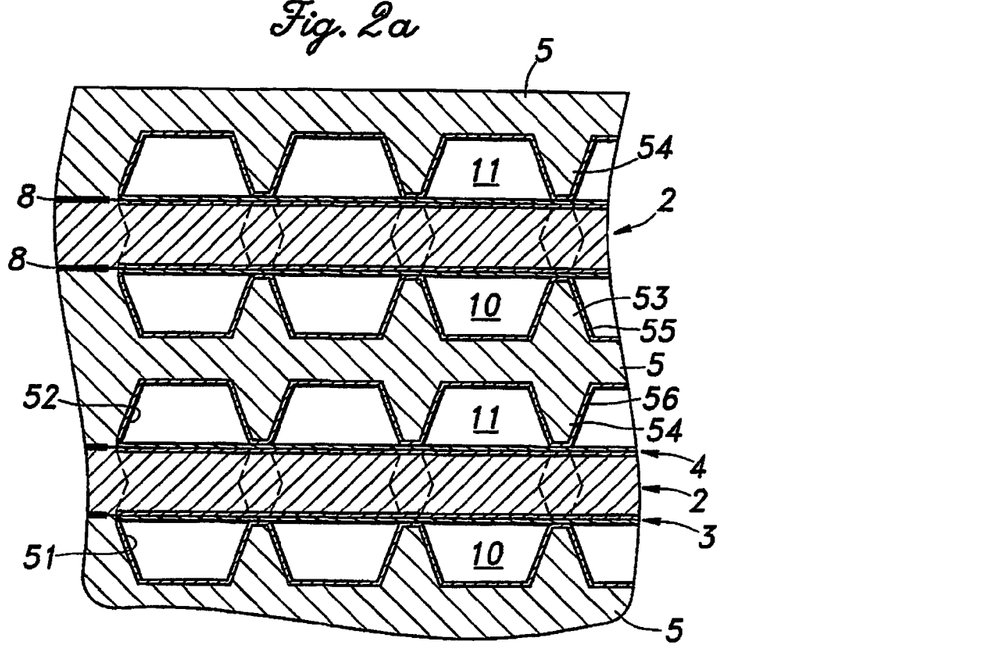
FIG. 2a is a sectional view taken along line IIa-IIa of FIG. 1.
Figure 2B:
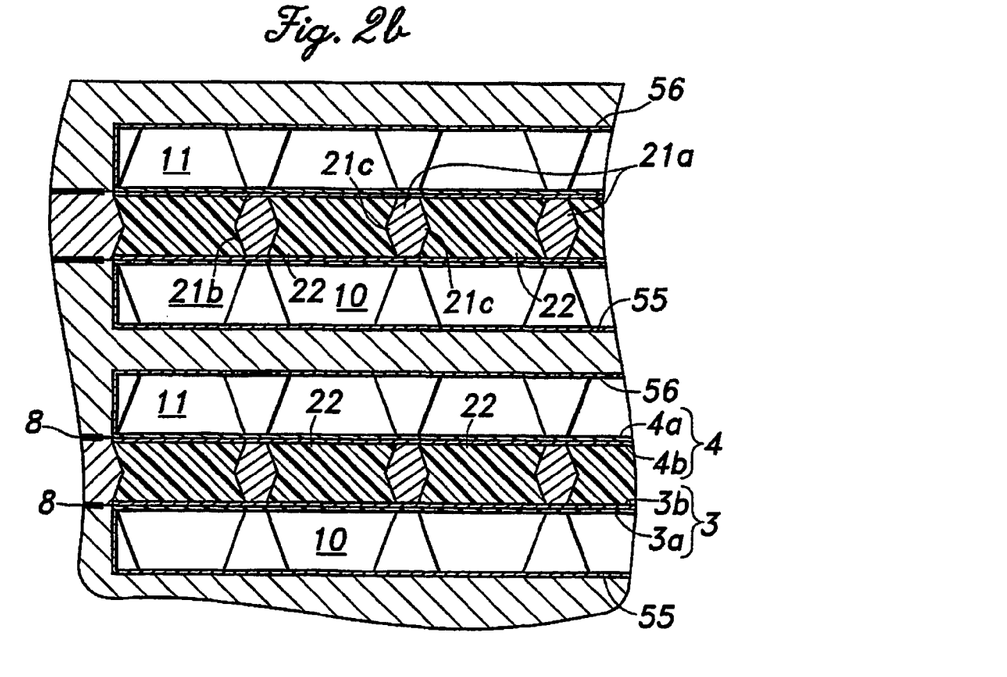
FIG. 2b is a sectional view taken along line IIb-IIb of FIG. 1.

Referring also to FIGS. 2a and 2b, each fuel cell 1 includes a central electrolyte layer 2, a pair of gas diffusion electrode layers 3 and 4 placed on either side of the central electrolyte layer 2, and a pair of flow distribution plates 5 placed on either outer side of the gas diffusion electrode layers 3 and 4. The outer side of each flow distribution plate 5 is similarly formed as the inner side thereof so as to serve as the flow distribution plate for the adjacent fuel cell.

The electrolyte layer 2 comprises a grid frame 21, and solid polymer electrolyte (SPE) 22 which is filled into rectangular through holes 21b defined between adjacent bars 21a of the grid frame 21. The SPE 22 may be made from such materials as perfluorocarbonsulfonic acid (Nafion: tradename), phenolsulfonic acid, polyethylenesulfonic acid, polytrifluorosulfonic acid, and so on.

The grid frame 21 is formed by etching or otherwise working a silicon wafer, and is provided with a rectangular and annular fringe portion and a rectangular grid area defined inside the annular fringe portion. Each bar 21a in the grid area of the grid frame 21 is provided with a projection 21c at an intermediate part thereof so as to project into an intermediate part of the corresponding through hole 21b as best shown in FIGS. 2a and 2b. The projection 21c is in the shape of a ridge extending along the length of the bar 21a, and produces a narrower middle part in each through hole 21b. The projection 21c helps to retain the SPE 22 in each through hole 21b.

Figure 3A:
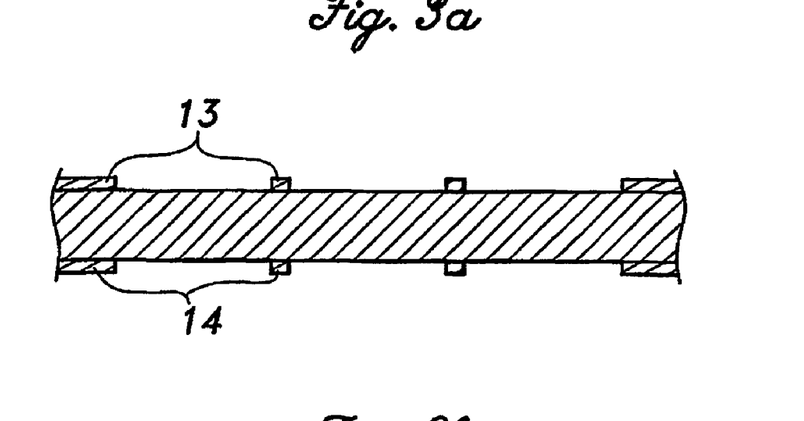
FIGS. 3a to 3c are sectional views of the electrolyte layer in different steps of the fabrication process.
Figure 3B:
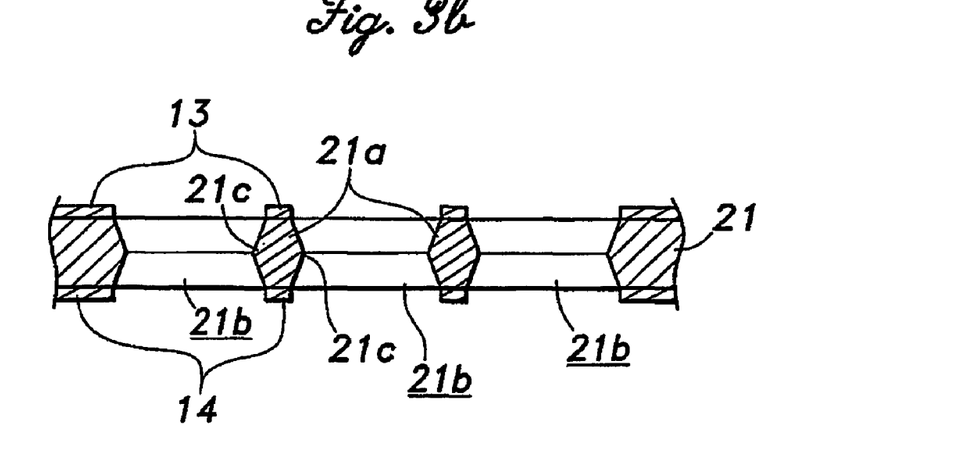
Figure 3C:
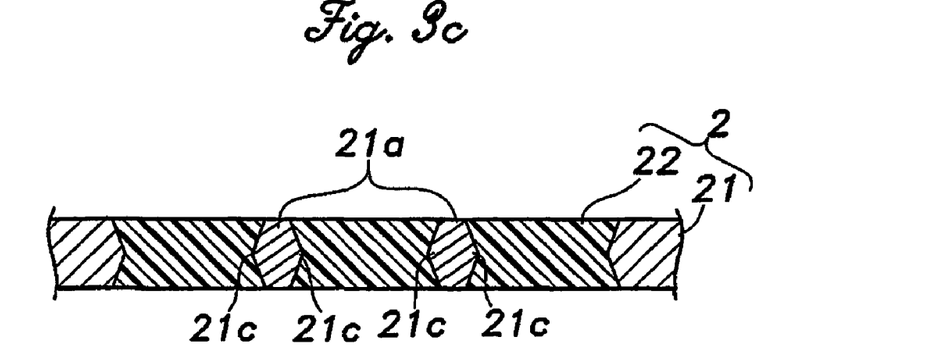

Such a projection can be conveniently formed at the same time as forming the grid frame 21. FIGS. 3a to 3c illustrate the process of forming the electrolyte layer 2. First of all, a suitably patterned photoresist layer 13 and 14 is placed on each side of a silicon wafer serving as the material for the grid frame 21 as shown in FIG. 3a. An anisotropic etching is performed from both sides of the wafer as illustrated in FIG. 3b, and this produces a plurality of through holes 21b each of which is narrowed in a middle part by the projection 21c. Then, the photoresist layers 13 and 14 are removed, and SPE 22 is filled into each of the through holes 21b so as to define a substantially flush planar surface on each side of the electrolyte layer 2.

In this embodiment, a rectangular through hole 23a, 23b, 24a and 24b is formed in each corner portion of the fringe portion of the grid frame 21. One of the diagonally opposing pairs of these through holes 23a and 23b serve as inlet and outlet for the fuel gas. The remaining opposing pair of these through holes 24a and 24b serve as inlet and outlet for the oxidizing gas. These through holes are formed as rectangular holes as they are formed by anisotropic etching (wet etching) in a similar manner as the through holes 21b are formed, but may also be formed as circular holes or holes of any other shape if they are formed by dry etching.

Each flow distribution plate 5 is also formed by working a silicon wafer, and has a substantially conformal rectangular shape. A rectangular recess 51 or 52 having a flat bottom is formed centrally on each side of the flow distribution plate 5, and a plurality of projections 53 or 54 each having the shape of a truncated pyramid are formed on the flat bottom. The surface of the recesses 51 and 52 and the projections 53 and 54 are coated with a gold plate layer serving as an electrode terminal layer 55 or 56 by suitable means for electrically connecting the gas diffusion electrode layers 3 and 4 to an external circuit.

Figure 4A:
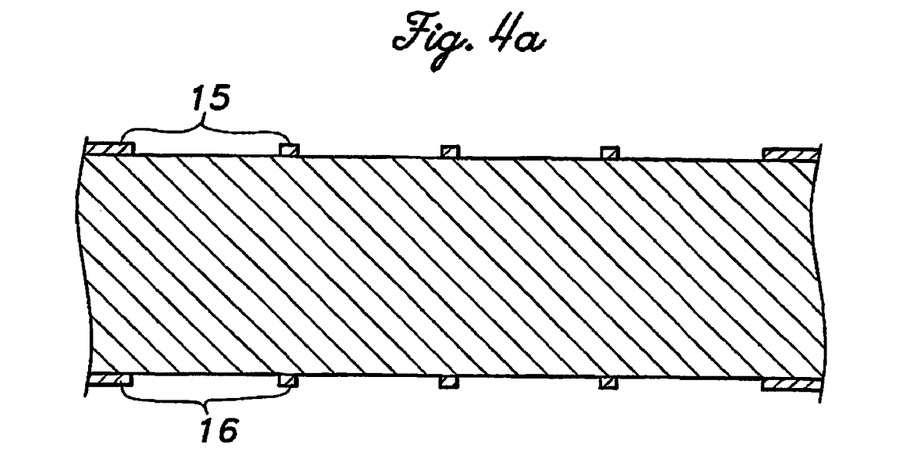
FIGS. 4a to 4c are sectional views of the flow distribution plate in different steps of the fabrication process.
Figure 4B:
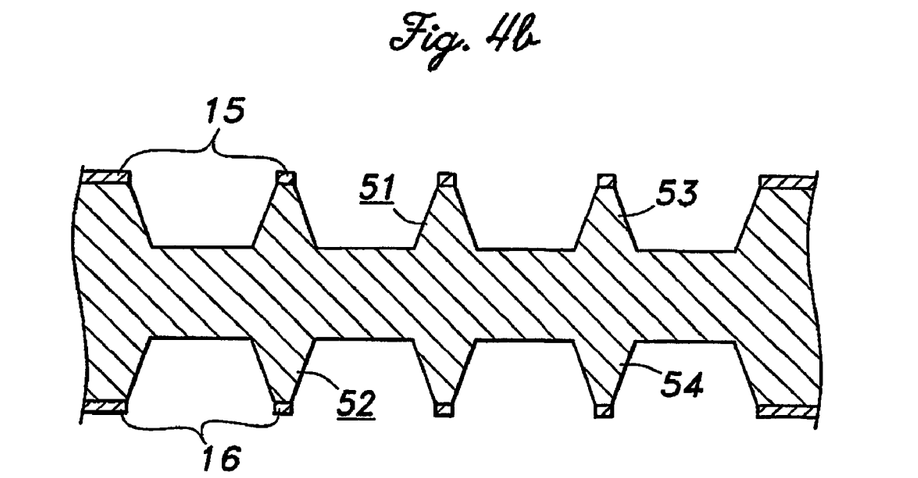
Figure 4C:
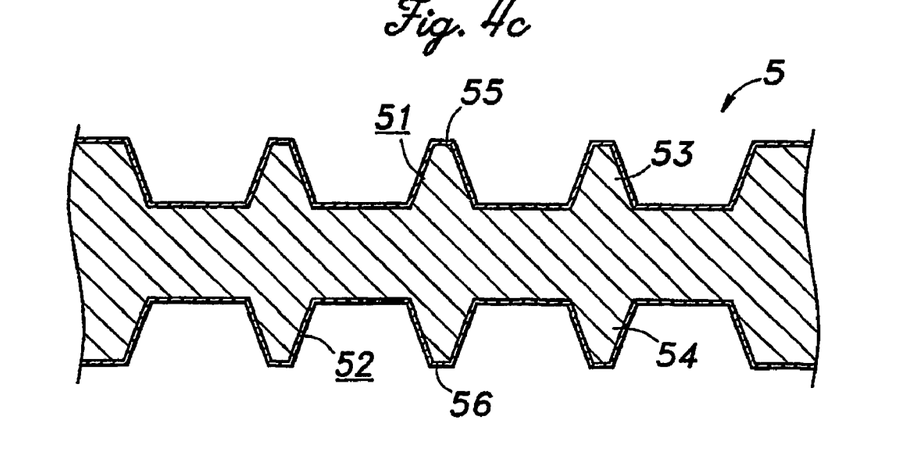

FIGS. 4a to 4c show the process of forming each flow distribution plate 5. A suitably patterned photoresist layer 15 or 16 is formed on each side of a silicon wafer as shown in FIG. 4a, and the silicon wafer is etched from both sides to form the recesses 51 and 52 and projections 53 and 54 at the same time as shown in FIG. 4b. The distribution plate 5 on the upper end or lower end of each fuel cell stack may be provided with a recess and projections only on the inner side thereof. Thereafter, the photoresist layers 15 and 16 are removed, and an electrode terminal layer 55 and 56 is formed over the surface of the recesses 51 and 52 and projections 53 and 54 as shown in FIG. 4c.

The distribution plate 5 is conformal to the grid frame 21, and therefore has a rectangular shape. A rectangular through hole 57a, 57b, 58a or 58b is formed in each corner portion of the fringe portion thereof One of the diagonally opposing pairs of these through holes 57a and 57b serve as inlet and outlet for the fuel gas. The remaining opposing pair of these through holes 58a and 58b serve as inlet and outlet for the oxidizing gas. As shown in FIG. 1, grooves 59a and 59b formed in the fringe portion communicate the recess 51 with the through holes 58a and 58b for the oxidizing gas, respectively, and similar grooves 60a and 60b communicate the recess 52 with the through holes 57a and 57b for the fuel gas, respectively. These grooves 59a, 59b, 60a and 60b have a V-shaped cross section as they are formed by anisotropic etching (wet etching). The through holes 57a, 57b, 58a and 58b have rectangular through holes in this embodiment because they are formed by anisotropic etching in the same manner as the through holes 21b of the grid frame 21.

Figure 5:
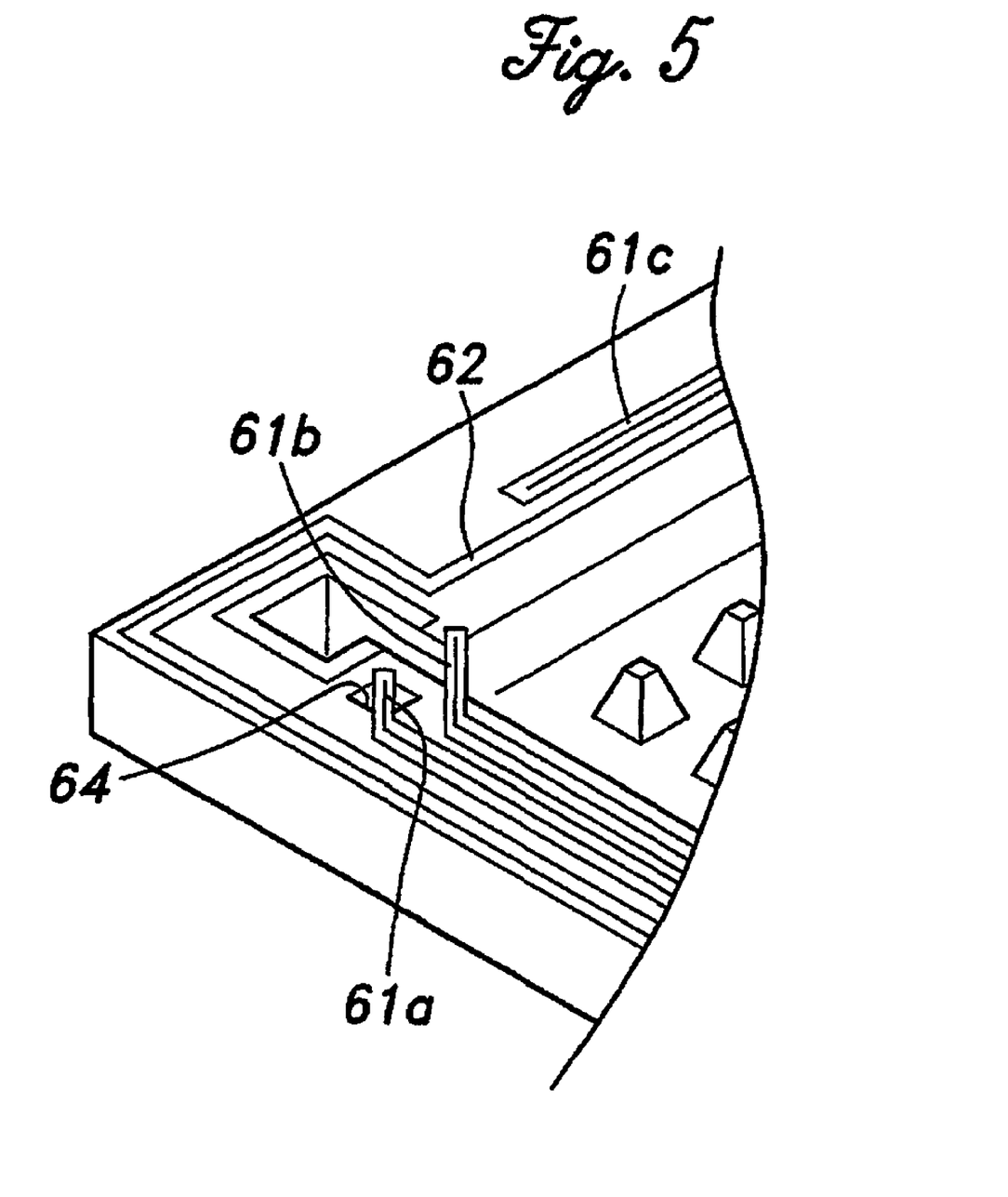
FIG. 5 is an enlarged fragmentary perspective view showing the sensor and heater of the fuel cell of the present invention.
Figure 6A:
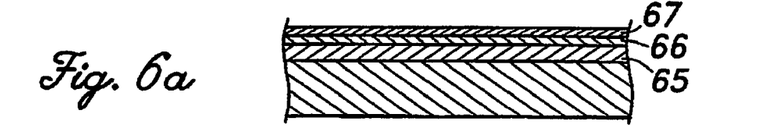
Figure 6B:
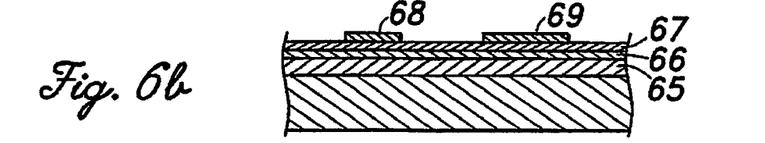
Figure 6C:
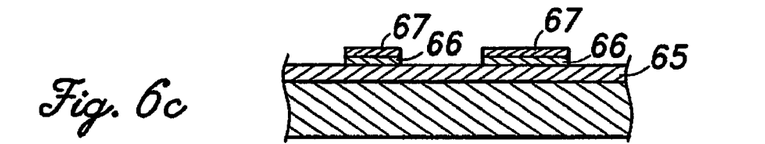
Figure 6D:
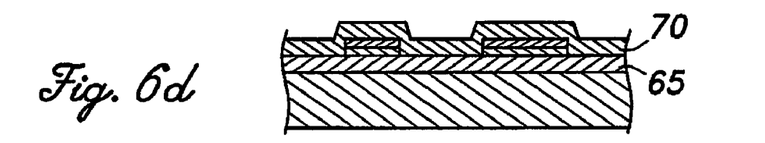
Figure 6E:
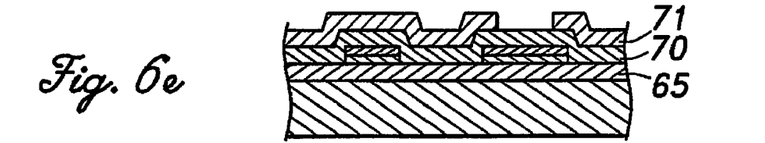
Figure 6F:
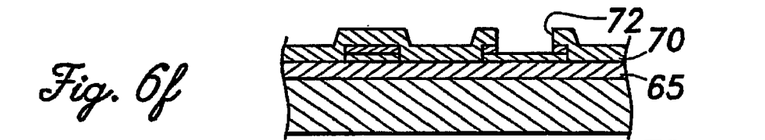
Figure 6G:
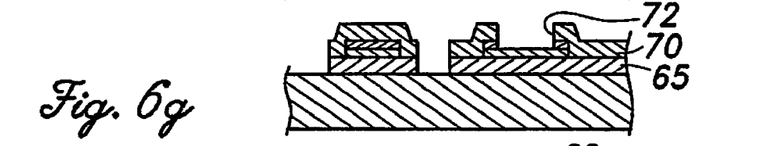
Figure 6I:
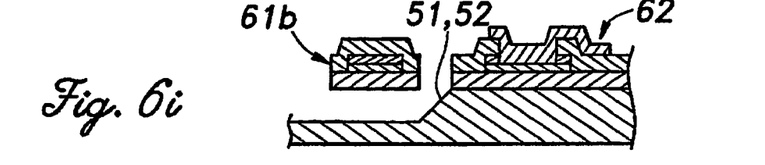

Referring to FIG. 5, a gas temperature sensor 61a, flow rate sensor 61b, electrolyte temperature sensor 61c are formed integrally with the flow distribution plate 5. The gas temperature sensor 61a and electrolyte temperature sensor 61c have thermocouples including a platinum layer and platinum-rhodium layer which are formed on the flow distribution plate 5 and appropriately worked. It is also possible to form a temperature sensor by suitably doping a part of the silicon wafer, and making use of changes in electric current conducted through a semiconductor layer formed on the silicon wafer according to the changes in temperature. The gas temperature sensor 61a is placed over an independent recess 64 of the flow distribution plate 5 to measure the temperature of stationary gas. The flow rate sensor 61b consists of a resistive sensor (hot wire sensor) which changes its electric resistance according to the change in the temperature as a result of changes in the flow rate of the surrounding gas. Additionally, a heater 62 is formed along the peripheral part of the flow distribution plate 5 to reduce the time period required for achieving the proper output level, and ensure a stable power generation by appropriately raising the temperature of the fuel cell. The gas temperature sensor 61a, flow rate sensor 61b, electrolyte temperature sensor 61c and heater 62 are shown only on the upper surface of the lower most flow distribution plate 5 in FIG. 1, but such sensors 61a, 61b and 61c and heater 62 may be provided on both sides of each intermediate flow distribution plate 5, and the lower surface of the upper most flow distribution plate 5. The positions and numbers of the sensors and heaters can be selected at will as long as they can be formed by the film forming process and etching process which are described hereinafter.

The process of fabricating the flow rate sensor 61b and heater 62 is described in the following with reference to FIGS. 6(a) to 6(i). A SiN insulating layer 65, Pt resistive layer 66 and SiN insulating layer 67 are deposited on the surface of a silicon wafer, for instance by physical vapor deposition, in this order (FIG. 6(a)). Resist layers 68 and 69 are then formed after the pattern of the flow rate sensor 61b and heater 62 (FIG. 6(b)). The parts of the Pt resistive layer 66 and SiN insulating layer 67 exposed from the resist layers 68 and 69 are removed by etching, and the photoresist layers 68 and 69 are removed (FIG. 6(c)). Then, the assembly is overcoated with a SiN insulating layer 70 (FIG. 6(d)). A resist layer 71 is then formed over the assembly, excluding the parts that will define a window 72 for an electrode of the heater 62 (FIG. 6(e)). The window 72 is formed by etching away the corresponding parts of the SiN insulating layer 70 and SiN insulating layer 67, and the resist layer 71 is removed (FIG. 6(f)). The parts of the SiN insulating layers 65 and 70 that will become the recesses 51 and 52 and the grooves 59a and 59b are removed in a similar fashion as described above (FIG. 6(g)). A Cr or Au layer is formed, and is appropriately patterned so as to form an electrode layer 74 (FIG. 6(h)) for the heater 62. Then, an etching process is conducted as illustrated in FIGS. 4(a) to 4(c) so that the flow rate sensor 61b is formed at the same time as the recesses 51 and 52 and the projections 53 and 54 are formed (FIG. 6(i)). By forming the flow rate sensor 61b at a certain angle with respect to the crystal orientation of the silicon wafer, and performing an anisotropic etching, the flow rate sensor 61b can be undercut by etching, and a desired gas passage can be formed under the flow rate sensor 61b.

The gas temperature sensor 61a can be formed in a similar manner as the flow rate sensor 61b and heater 62, but additionally requires the step of forming a platinum-rhodium layer. In particular, the electrolyte temperature sensor 61c does not require any undercut etching, but can be formed at the same time as the gas temperature sensor 61a by using the same material. Therefore, the description of the process of forming the gas temperature sensor 61a and electrolyte temperature sensor 61c is omitted.

The film forming process described above is not limited to physical vapor deposition, but may also include various forms of chemical vapor deposition (CVD), sputtering, various forms of plating, coating such as sol-gel process accompanied by drying or curing, and the process for removing layers may include wet etching, dry etching, plasma etching, electrical discharge machining, laser beam machining and electron beam machining.

The gas diffusion electrode layers 3 and 4 each consist of a carbon sheet 3a or 4a having a layer of a platinum catalyst 3b and 4b mixed with SPE formed on the side thereof facing the electrolyte layer 2.

In this manner, in each fuel cell, a pair of flow distribution plates 5 are placed on either side of an electrolyte layer 2 via a gas diffusion electrode layer 3 or 4, and these components are joined by using a bonding agent along the parts surrounding the recesses. Therefore, a plurality of narrow passages 11 are defined in one of the central recesses 52 of each electrolyte layer 2 for the fuel gas, and a plurality of similar narrow passages 10 are defined in the other of the central recesses 51 of the electrolyte layer 2 for the oxidizing gas. Each projection is substantially entirely covered by a gold plate layer serving as an electrode terminal, and lightly pushes the gas diffusion electrode layer 3 or 4 against the frame grid 21 of the electrolyte layer 2. Therefore, each gas diffusion electrode layer 3 or 4 is electrically connected to the corresponding distribution plate 5 via a large number of projections in a parallel relationship, and a reliable electric connection between the electrolyte layer 2 and an external circuit can be established.

The adhesion between the grid frame 21 and the distribution plates 5 can be accomplished in a number of different ways. Preferably, anodic bonding may be used instead of the bonding by using a bonding agent. In this case, the leads from the sensors 61a, 61b and 61c and the heater 62 may be passed through holes extending across the thickness of the flow distribution plate 5 and connected to an external circuit from the reverse surface of the flow distribution plate 5.

As fuel gas and oxidizer gas (air) are passed through the fuel cell 1 while energizing the heater 62 according to the signals from the sensors 61a, 61b and 61c, an electrochemical reaction takes place with the aid of the catalyst (Pt), and a voltage is produced between the electrode terminal layers 55 and 56. A stack that includes a plurality of such fuel cells can thus serve as a power source for an external circuit.

As can be appreciated from the foregoing description, according to the present invention, in a fuel cell assembly comprising at least one cell including an electrolyte layer, a pair of gas diffusion electrode layers interposing the electrolyte layer between them, and a pair of flow distribution plates for defining passages for fuel and oxidizer gases that contact the gas diffusion electrode layers, a heater and/or a sensor for detecting temperature, gas flow rate or gas pressure is integrally formed with at least one of the flow distribution plates. Thus, the forming of the sensor and heater is simplified, and by embedding them in a substrate, the need for any special sealing arrangement can be eliminated. In particular, by forming the sensor and/or heater with layers deposited on a flow distribution plate, and forming the flow distribution plate by etching a substrate, the sensor and/or heater can be fabricated as a part of the process of fabricating the fuel cell.

Although the present invention has been described in terms of preferred embodiments thereof, it is obvious to a person skilled in the art that various alterations and modifications are possible without departing from the scope of the present invention which is set forth in the appended claims. For instance, although the fuel and oxidant for the fuel cells are described and claimed as gases throughout the text of this application, it should be understood that they may also include liquid without departing from the scope and spirit of this application.

The invention claimed is:

1. A fuel cell assembly comprising at least one cell including an electrolyte layer, a pair of gas diffusion electrode layers interposing said electrolyte layer between them, and a pair of flow distribution plates for defining passages for fuel and oxidizer gases that contact said gas diffusion electrode layers, characterized by that: a heater or a sensor is arranged in a pattern along the entire peripheral part of at least one of said flow distribution plates, wherein said sensor is one or more of a gas temperature sensor, a gas flow rate sensor or a gas pressure sensor.

2. A fuel cell assembly according to claim 1, wherein said heater or said sensor each has electrical leads and at least one of said pair of flow distribution plates having at least one through-hole through its surface and located at a respective corner portion, and wherein said leads pass through said through hole extending across the thickness of the respective flow distribution plate.

3. A fuel cell assembly according to claim 1, wherein said sensor is two or more of said gas temperature sensor, said gas flow rate sensor or said gas pressure sensor.

4. A fuel cell assembly according to claim 1, wherein said gas temperature sensor has a portion placed over a recess formed in an outer and peripheral part of said flow distribution plate, wherein said recess formed in said outer and peripheral part is adapted to contain said fuel or oxidizer gas in a stationary state.

5. A fuel cell assembly according to claim 1, wherein at least one of said pair of flow distribution plates is an intermediate flow distribution plate defining passages for fuel and oxidizer gases on both sides thereof and said heater and said sensor are on both sides of said intermediate flow distribution plate.

* * * * *